(12) United States Patent
Demoise, Jr. et al.

(10) Patent No.: US 9,285,033 B2
(45) Date of Patent: Mar. 15, 2016

(54) DOMED DIAPHRAGM / INSERT PLATE FOR A PRESSURE VESSEL ACCESS CLOSURE

(75) Inventors: Thomas Edwin Demoise, Jr., Greensburg, PA (US); Robert Leslie Sylvester, Jefferson Hills, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 2022 days.

(21) Appl. No.: 12/555,826

(22) Filed: Sep. 9, 2009

(65) Prior Publication Data

US 2011/0056950 A1 Mar. 10, 2011

(51) Int. Cl.
*F16J 13/12* (2006.01)
*F16J 3/02* (2006.01)

(52) U.S. Cl.
CPC ... *F16J 13/12* (2013.01); *F16J 3/02* (2013.01)

(58) Field of Classification Search
CPC ..................................... F16J 13/12; F16J 3/02
USPC ................. 220/378, 790, 802, 315, 324, 325; 976/DIG. 166, DIG. 167, DIG. 168, 976/DIG. 169
See application file for complete search history.

(56) References Cited

U.S. PATENT DOCUMENTS

| | | | |
|---|---|---|---|
| 2,309,856 A | 2/1943 | Mason | |
| 2,716,506 A | 8/1955 | Fike | |
| 3,313,599 A | 4/1967 | Boon | |
| 3,478,915 A | 11/1969 | Smith | |
| 3,777,772 A | 12/1973 | Arnold et al. | |
| 6,102,237 A * | 8/2000 | Nguyen et al. | 220/276 |
| 6,336,567 B1 * | 1/2002 | Hyobu | 220/230 |
| 6,921,090 B2 | 7/2005 | Sun | |
| 2002/0113420 A1 * | 8/2002 | Neunzert | B60R 21/2644 280/736 |
| 2007/0007233 A1 * | 1/2007 | Brown | 215/342 |
| 2010/0072164 A1 * | 3/2010 | Smith et al. | 215/252 |

FOREIGN PATENT DOCUMENTS

| | | |
|---|---|---|
| FR | 2574975 A1 | 6/1986 |
| GB | 2106442 A | 4/1983 |

OTHER PUBLICATIONS

Supplementary European Search Report for EP10786574 dated Mar. 14, 2014.

* cited by examiner

*Primary Examiner* — Robert J Hicks
*Assistant Examiner* — Kareen Thomas
(74) *Attorney, Agent, or Firm* — Richard J. Coldren; Westinghouse Electric Company LLC (57) ABSTRACT

A pressure vessel closure for an access opening that has a sealing surface surrounding the access opening and one of either a diaphragm or insert that spans the access opening with a peripheral flange that rests on the sealing surface. The insert or diaphragm has a continuously rounded portion that extends into the access opening and a cover extends over the insert or diaphragm. A gasket is interposed between the flange of the insert and the sealing surface or a fillet weld attaches the flange of the diaphragm to the sealing surface. A locking device secures the cover to a wall of the pressure vessel and urges the flange against the sealing surface.

12 Claims, 7 Drawing Sheets

DOMED DIAPHRAGM / INSERT PLATE FOR A PRESSURE VESSEL ACCESS CLOSURE

CROSS REFERENCE TO RELATED APPLICATIONS

This application claims the benefit of Provisional application Ser. No. 61/185,706, filed Jun. 10, 2009.

BACKGROUND OF THE INVENTION

1. Field of the Invention

This invention pertains in general to access opening cover seals and more particularly to pressure vessels that employ access opening cover seals.

2. Description of the Related Art

Steam generators used in nuclear reactor power plants are very large heat exchangers where heat from a primary fluid heated by a nuclear reactor is transferred to a secondary fluid which is converted into steam and used to drive a turbine generator. Steam generator heat exchangers are housed inside a tall, generally cylindrical steel shell. A large number of U-shaped heat exchanger tubes are enclosed in the shell and have their ends inserted in holes formed in a horizontal tube sheet or plate near the bottom of the steel shell. The tubes are used to convey the primary fluid which has been heated in the nuclear reactor. The secondary fluid or feedwater used to generate the steam is introduced into the steam generator in such a manner that the secondary fluid flows around the outside of the heated tubes thereby converting much of the secondary fluid into steam which is allowed to exit the steam generator through an outlet nozzle at the top of the steel shell.

In the past, steam generator tubing in nuclear plants has been exposed to extreme operating conditions and were susceptible to stress corrosion cracking, mechanical wear, wall thinning and pitting. To address this susceptibility, a number of techniques have been developed to inspect steam generator tubing for degradation prior to tubing failure in order to prevent leakage of the primary radioactive coolant into the secondary side which would result in forced outages. Steam generator tubing has been most commonly inspected using a variety of eddy current methods, most involving probes which were inserted into the tubes from the underside of the tube sheet on the primary side of the steam generator. The probes are inserted through a steam generator manway in the lower hemispherical primary coolant inlet and outlet side of the steam generator below the tube sheet and into the tube sheet whereby the corresponding tubes are mapped by inserting the probes up through the tubes. In addition, to minimize the onset of stress corrosion cracking, denting and wall thinning of the tubes, maintenance is regularly performed on the secondary side of the steam generator during scheduled plant outages to remove sludge, other deposits and loose parts. These maintenance operations require access to both the primary and secondary sides of the steam generator through access openings, e.g., manways that are provided in the steam generator shell and channel head. These access openings have removable covers that necessarily have to be resealed after the maintenance operation to restore the barrier to the pressurized environment that exists in the interior of the primary and secondary side of the generator during plant operation.

The access opening covers in use currently typically employ planar insert plates or diaphragms that can respectively accommodate either gasket closures or seal welded closures. Such a design uses the same cover and threaded fasteners whether the closure was made with a gasket or seal welded diaphragm. The purpose of the insert is to provide an inside diameter restraint and sealing surface for the gasket and to provide a relief or gap between the cover and the access pad surface of the pressure vessel against which the seal is established as well as to provide a corrosion resistant barrier between the fluid and the typically ferritic cover material. If the pad gasket seating surface is damaged during operation or routine servicing during a shutdown, sealing can be provided by a seal welded diaphragm, in the event the time for a repair is not available. Seal welded diaphragms are generally only used when the gasket seating surface is damaged and repair is not practical or when access through the opening is believed to be infrequent.

When it has been necessary to use seal weld diaphragms small fillet welds are typically used to allow easy removal at the site if and when access to the steam generator internals is required. Because of the diaphragm configuration and type of weld used, qualification of the weld design to ASME B&PV Code Section III rules has not been possible. The main issue in developing a design acceptable to the Code is to achieve an acceptable Code fatigue usage for a forty or sixty year life. Since the weld is outside the Code jurisdictional boundary, meeting the Code is not mandatory. However, from a functional standpoint it is necessary to provide a design that has margin against failure of the weld which would result in a leak. Having a design that meets the ASME Code would provide sufficient margin to ensure a leak free joint.

Accordingly, it is an object of this invention to provide a seal between a pressure vessel wall and an access opening cover that satisfies ASME Code requirements.

It is a further object of this invention to provide such a seal that will reduce the stresses on the weld to lessen the likelihood of fatigue failure over the life of the seal as well as bending loads on the cover attachment hardware.

It is still a further object of this invention to provide such a seal that will last for the life of the pressure vessel in which it is installed.

SUMMARY OF THE INVENTION

These and other objects are achieved by providing a pressure vessel having a wall with an access opening and an improved closure for the access opening. The improved closure having a sealing surface on the wall surrounding the access opening with one of either a male or female locking device formed on or in the wall radially outward from the sealing surface at a plurality of locations around the access opening. An insert or diaphragm is positioned to span the access opening with the diaphragm having a peripheral flange that rests over the sealing surface and a continuously rounded portion in between an inner edge of the flange. A sealing member is formed between the sealing surface and the flange of the insert or diaphragm and a cover extends over the access opening and the diaphragm and extends radially outward to at least the one of either the male or female locking device. The other of the male or female locking device connects the cover to the wall by engaging the one of the male or female locking device and pressures the cover against the flange of the diaphragm or insert.

In one embodiment the sealing member is a gasket and in another embodiment the sealing member is a weld and preferably a fillet weld. Preferably the locking device is a threaded fastener that extends through an opening in the cover and into a threaded recess in the wall. The threaded fastener could be a bolt or a threaded stud or the like.

In still another embodiment the rounded portion of the insert or diaphragm extends into the access opening and desirably the rounded portion is either hemispherical or ellipsoidal. Typically the flange of the diaphragm is thicker than the rounded portion.

BRIEF DESCRIPTION OF THE DRAWINGS

A further understanding of the invention can be gained from the following description of the preferred embodiment when read in conjunction with accompanying drawings in which.

DESCRIPTION OF THE PREFERRED EMBODIMENT

Figure 1:
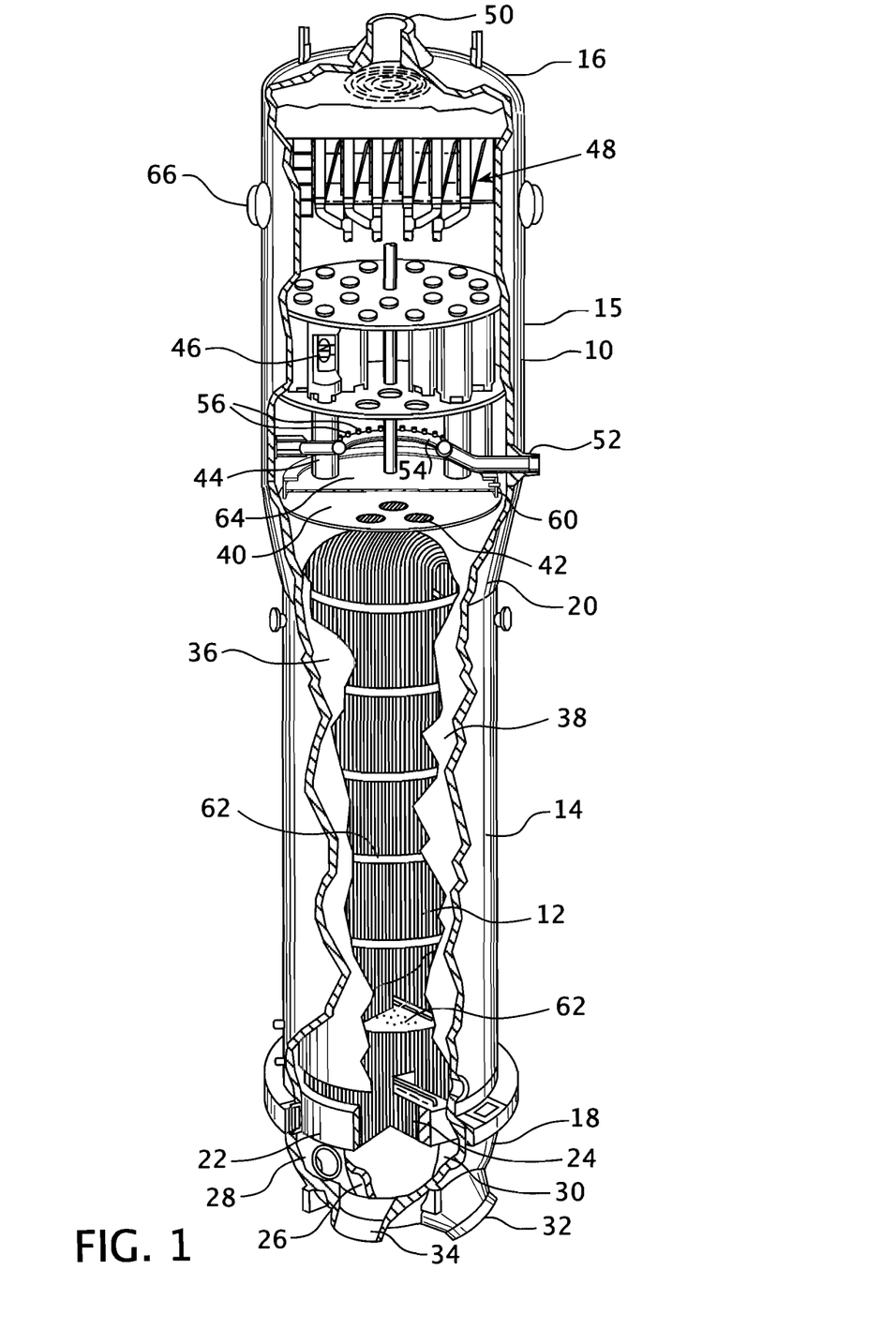
FIG. 1 is a perspective view, partially cut away, of a vertical steam generator for which the access opening cover seal of this invention may be applied.

Referring to the drawings, FIG. 1 shows a steam or vapor generator 10 that utilizes a plurality of U-shaped tubes which form a tube bundle 12 to provide the heating surface required to transfer heat from a primary fluid traveling within the tubes to vaporize or boil a secondary fluid surrounding the outside of the tubes. The steam generator 10 comprises a vessel having a vertically oriented tubular shell portion 14 and a top enclosure or dished head 16 enclosing the upper end and a generally hemispherical shaped channel head 18 enclosing the lower end. The lower shell portion 14 is smaller in diameter than the upper shell portion 15 and a tube sheet 22 is attached to the channel head 18 and has a plurality of holes 14 disposed therein to receive ends of the U-shaped tubes. A dividing plate 26 is centrally disposed within the channel head 18 to divide the channel head into two compartments 28 and 30, which serve as headers for the tube bundle. Compartment 30 is the primary fluid inlet compartment and has a primary fluid inlet nozzle 32 in fluid communication therewith. Compartment 28 is the primary fluid outlet compartment and has a primary fluid outlet nozzle 34 in fluid communication therewith. Thus, primary fluid, i.e., the reactor coolant, which enters fluid compartment 30 is caused to flow through the tube bundle 12 and out through outlet nozzle 34.

The tube bundle 12 is encircled by a wrapper 36 which forms an annular passage 38 between the wrapper 36 and the shell and cone portions 14 and 20, respectively. The top of the wrapper 36 is covered by a lower deck plate 40 which includes a plurality of openings 42 in fluid communication with a plurality of riser tubes 44. Swirl vanes 46 are disposed within the riser tubes to cause steam flowing therethrough to spin and centrifugally remove some of the moisture entrained within the steam as it flows through the primary centrifugal separator. The water separated from the steam in this primary separator is returned to the top surface of the lower deck plate. After flowing through the primary centrifugal separator, the steam passes through a secondary separator 48 before reaching a steam outlet 50 centrally disposed in the dished head 16.

The feedwater inlet structure of this generator includes a feedwater inlet nozzle 52 having a generally horizontal portion called a feedring 54 and discharge nozzles 56 elevated above the feedring. In later designs the feedwater ring is above the elevation of the feedwater inlet nozzle. The feedwater supplied through the feedwater inlet nozzle 52 passes through the feedring 54 and exits through discharge nozzles 56 and mixes with water which was separated from the steam and is being recirculated. The mixture then flows down above the lower deck plate 40 into the annular passage 38. The water then enters the tube bundle at the lower portion of the wrapper 36 and flows along and up the tube bundle where it is heated to generate steam.

The hydraulic flow among the tube bundle and the change of phase from liquid to vapor of the secondary side feedwater causes meaningful vibration among the tubes within the tube bundle 12. Support plates 62 are arranged in tandem at spaced elevations along the tube bundle 12 and respectively have holes through which the corresponding tubes pass and are supported. During operation and as a result of the change of phase of the secondary side feedwater, a number of deposits form on the tube bundle 12, tube sheet 22 and the support plates 62. The deposits on the support plates can impair the flow of coolant through the support holes within the support plates 62 and reduce the efficiency of the heat transfer process. In addition, these deposits which form around the base of the tube sheet 22 and adjacent to the tubes extending through the support plates can result in the development of an environment corrosive to the tubes which can corrode and eventually breach the barrier between the primary and secondary side of the steam generator.

Furthermore, a loose parts collector weir 60, which is more fully described in U.S. Pat. No. 7,434,546, issued Oct. 14, 2008, and assigned to the Assignee of this application, can be employed on the lower deck plate 40. The loose parts collector weir 60 is a nearly cylindrical wall structure that is interior to the upper drum; i.e., the interior volume above the lower deck plate 40 of the steam generator 10, to retain loose parts along the transit path from the feedwater discharge nozzle 56 to the tube bundle 12.

In addition, some operating generators have sludge collectors 64 integrated with the lower deck plate 40. The sludge collectors form settling ponds that permits solids entrained in the recirculated coolant from the moisture separators to settle out.

The sludge that does settle around the tubes and the loose parts that do traverse the tube bundle create an extreme operating environment that makes the tubes in the tube bundle susceptible to stress corrosion cracking, mechanical wear, wall thinning and pitting. To address this susceptibility, a number of techniques have been developed to inspect steam generator tubing for degradation prior to tubing failure in order to prevent forced outages. Steam generator tubing has been most commonly inspected using a variety of eddy current methods, most involving probes which are inserted into the tubes from the underside of the tube sheet 22 on the primary side of the steam generator. The probes are inserted through a steam generator manway in the lower hemispherical inlet and outlet sides of the generator below the tube sheet 22 and into the tube sheet whereby the corresponding tubes are mapped by inserting the probes up through the tubes.

In addition to inspecting the tubes for flaws through the primary side, the steam generators are serviced during plant outages to remove loose parts and sludge that have settled on the lower deck plate 40 and other areas of the generator such as the tube sheet 22, to minimize further degradation of the heat exchanger tubes. Access to the interior of the generator for this purpose is provided through manways or access openings such as the access opening 66 in the upper steam drum. These access openings are sealed during steam generator operation to maintain a barrier between the pressurized atmosphere within the generator and that of the environment of the reactor containment. Insert plates (which are sometimes referred to as diaphragms or diaphragm plates) are used as part of the closure assemblies for the access openings when it is required to provide a closure design that accommodates either a gasket closure or a seal welded closure. Such a design uses the same cover and fastener arrangement whether the closure was made with an insert plate and gasket or seal welded diaphragm. The purpose of the insert plate is to provide an inside diameter restraint and sealing surface for the gasket and to provide a relief or gap between the cover and the access pad surface that surrounds the access opening as well as to provide a corrosion resistant barrier between the fluid and the typically ferritic cover material. If the pad gasket seating surface is damaged during operation, sealing can be provided by a welded diaphragm (which is another form of insert), when time for a repair is not available or when access through the opening is believed to be infrequent. Seal weld diaphragms employ small fillet welds to allow easy removal at the site if and when access to the steam generator internals is required. Because of the diaphragm configuration and the type of weld used, qualification of the weld design to ASME B & PV Code Section III rules has not been possible. The main issue in developing a design acceptable to the Code is to achieve an acceptable Code fatigue usage for a forty or sixty year plant life. Since the weld is outside the Code jurisdictional boundary, meeting the code is not mandatory. However, from a functional standpoint it is necessary to provide a design that has sufficient margin against failure of the weld that could result in a leak. Having a design that meets the ASME Code would provide sufficient margin to ensure a leak free joint.

Figure 2:
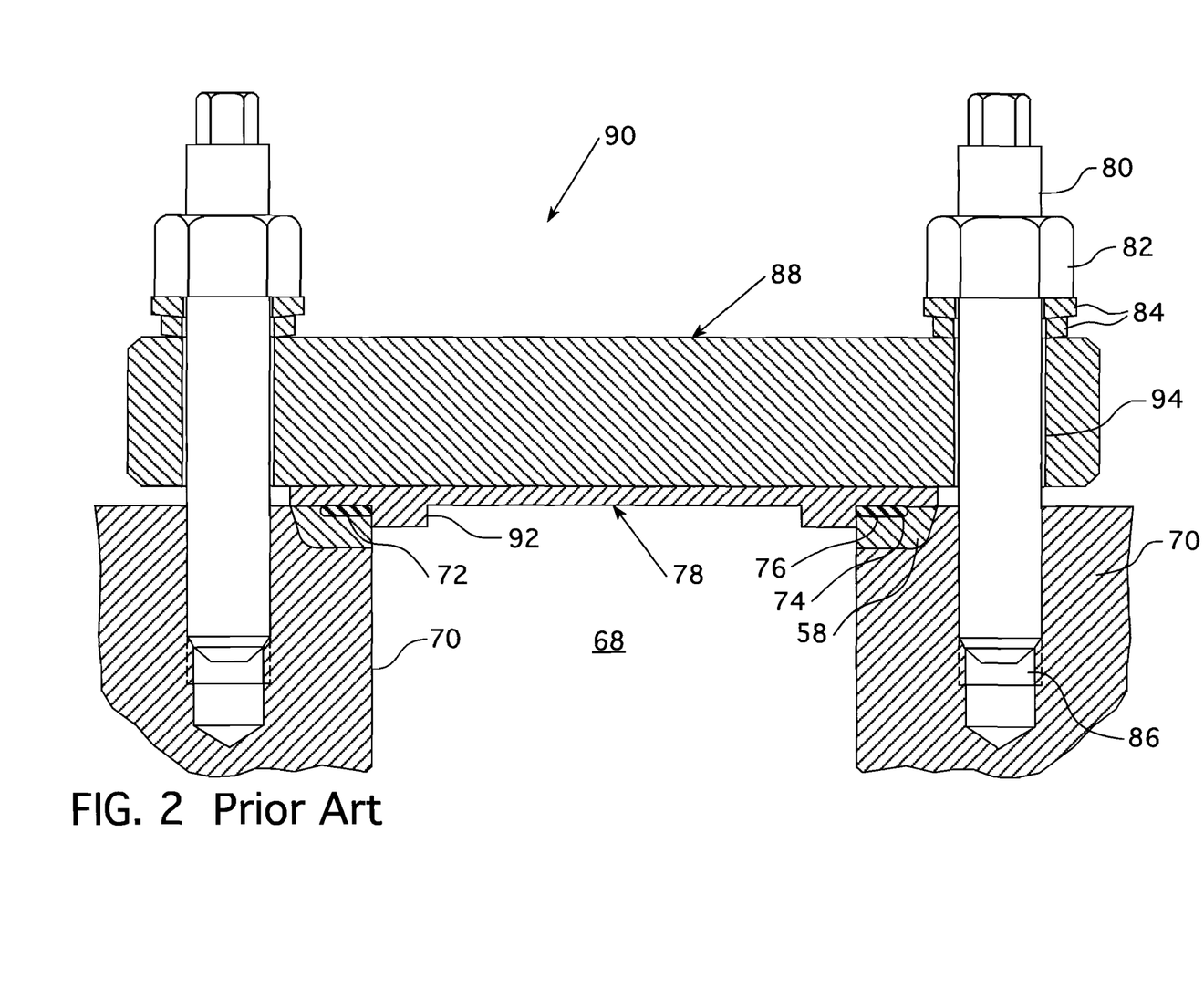
FIG. 2 is a side sectional view of a prior art closure that employs and insert and gasket seal.

To appreciate the improvement of this invention it is helpful to understand the current prior art access opening closure system. Such a prior art closure system 90 is shown in FIG. 2 positioned over an access opening 68 in a pressure vessel wall 70. In the embodiment shown, the pressure vessel wall 70 is provided with an annular recess 58 in which a corrosion resistant weld pad 72 is deposited to form the sealing surface. Though, it should be appreciated that the sealing surface can be machined directly into the pressure vessel wall 70. The weld pad 72 sealing surface is also provided with a recess 76 that is sized to accommodate an annular Flexitalic gasket 74. A flat plate insert 78 that has an annular projection 92 is positioned over the sealing surface 72 and gasket 74. The annular projection 92 functions to maintain the gasket seated in the recess 76 in the pad sealing surface 72. Threaded studs 80 extend through openings 94 in the cover 88 and into threaded recesses 86 in the pressure vessel wall 70. Complimentary threaded nuts 82 are screwed down over washers 84 to secure the cover 88 over the access opening 68 and urge the insert plate 78 against the gasket 74 to form a pressure tight seal.

Figure 3:
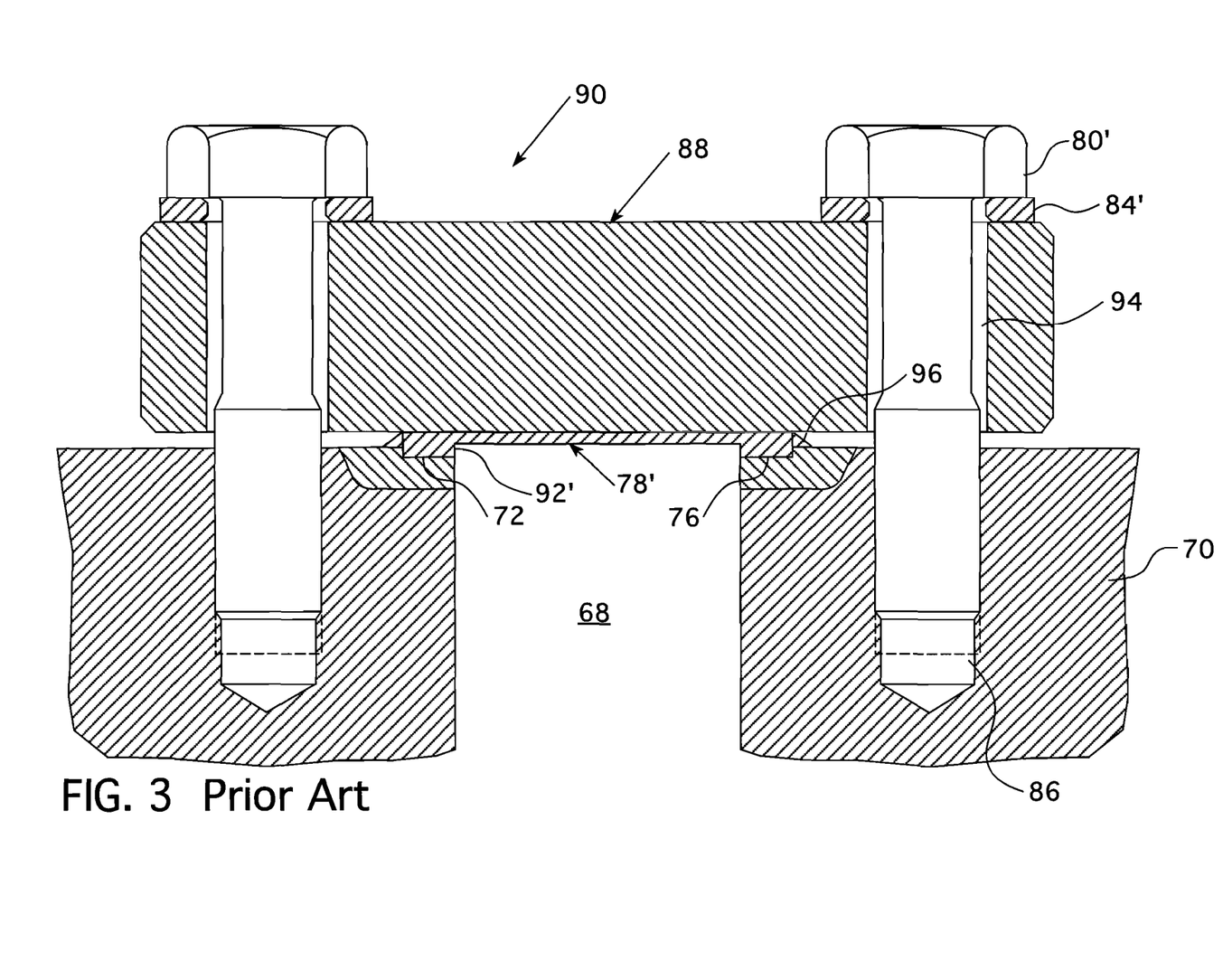
FIG. 3 is a side sectional view of a prior art closure that employs a diaphragm and fillet weld seal.

FIG. 3 shows a welded seal that can be employed in place of the flat insert plate gasket seal in the event the gasket seating surface of FIG. 2 is damaged and repair is not practical or access through the opening 68 is infrequent. Like reference characters are employed among the various figures to designate the same components and primed numbers are employed to identify corresponding components. In the seal shown in FIG. 3, the flat plate insert 78' that spans the access opening 68 is sometimes referred to herein as a diaphragm and has an annular projection 92' at its periphery that fits within the recess 76 in the sealing pad surface 72. A fillet weld 96 secures the peripheral surface of the diaphragm 78' to the sealing surface 72 to establish a pressure tight seal. Instead of the threaded stud fasteners 80 shown in FIG. 2, screws or bolt fasteners 80' extend through washers 84, through the cover 88 and into threaded recesses 86 in the pressure vessel wall 70. However, the studs 80 and screw fasteners 80' are interchangeable and either may be used.

The stresses on the diaphragm 78 to pad sealing surface 72 shown in FIG. 3 are primarily applied in two ways. In the first instance, bending of the cover and diaphragm plate 78' under internal pressure which results in bending of the diaphragm-to-pad fillet weld 96 and secondly, from dilation of the access opening 68 under internal pressure which pulls on the diaphragm 78' to pad 72 fillet weld 96. The weld stresses are further complicated by the size of the opening 68. Early steam generators applied the welded diaphragm to two-inch (5.1 cm) inside diameter inspection ports. There is a tendency on later and future steam generators to apply the weld diaphragm to larger openings such as four inches (10.2 cm), six inches (15.2 cm) and larger making qualification for fatigue very difficult if not impossible.

Figure 4:
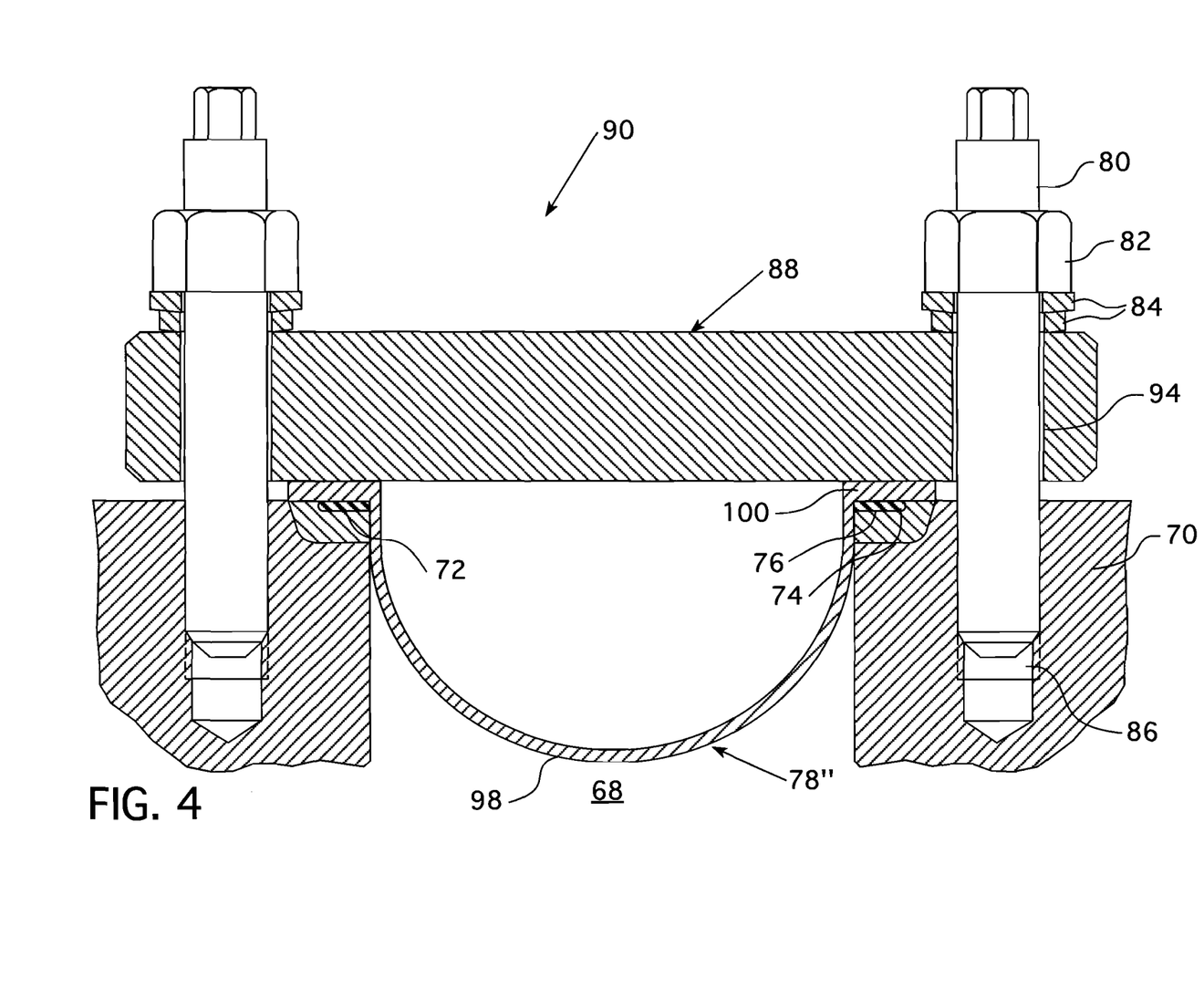
FIG. 4 is a side sectional view of a closure of this invention that employs a hemispherical insert and gasket seal.

A seal welded diaphragm design in accordance with this invention that reduces the foregoing stresses and, thus, fatigue usage on the weld, meets ASME code requirements and is easy to remove in the field is illustrated in FIGS. 4-7. This design may be employed with any pressure vessel access opening, regardless of size. FIG. 4 illustrates a gasket closure which is substantially identical to that shown in FIG. 2 except for the insert 78" which is constructed in accordance with one embodiment of this invention. The insert 78" that is positioned to span the access opening 78, has a peripheral flange 100 that rests over at least a portion of the sealing surface 72 and a continuously rounded portion in between an inner edge of the flange. The flange 100 is typically slightly thicker than the rounded portion 98, though that is not a requirement of this invention.

Figure 5:
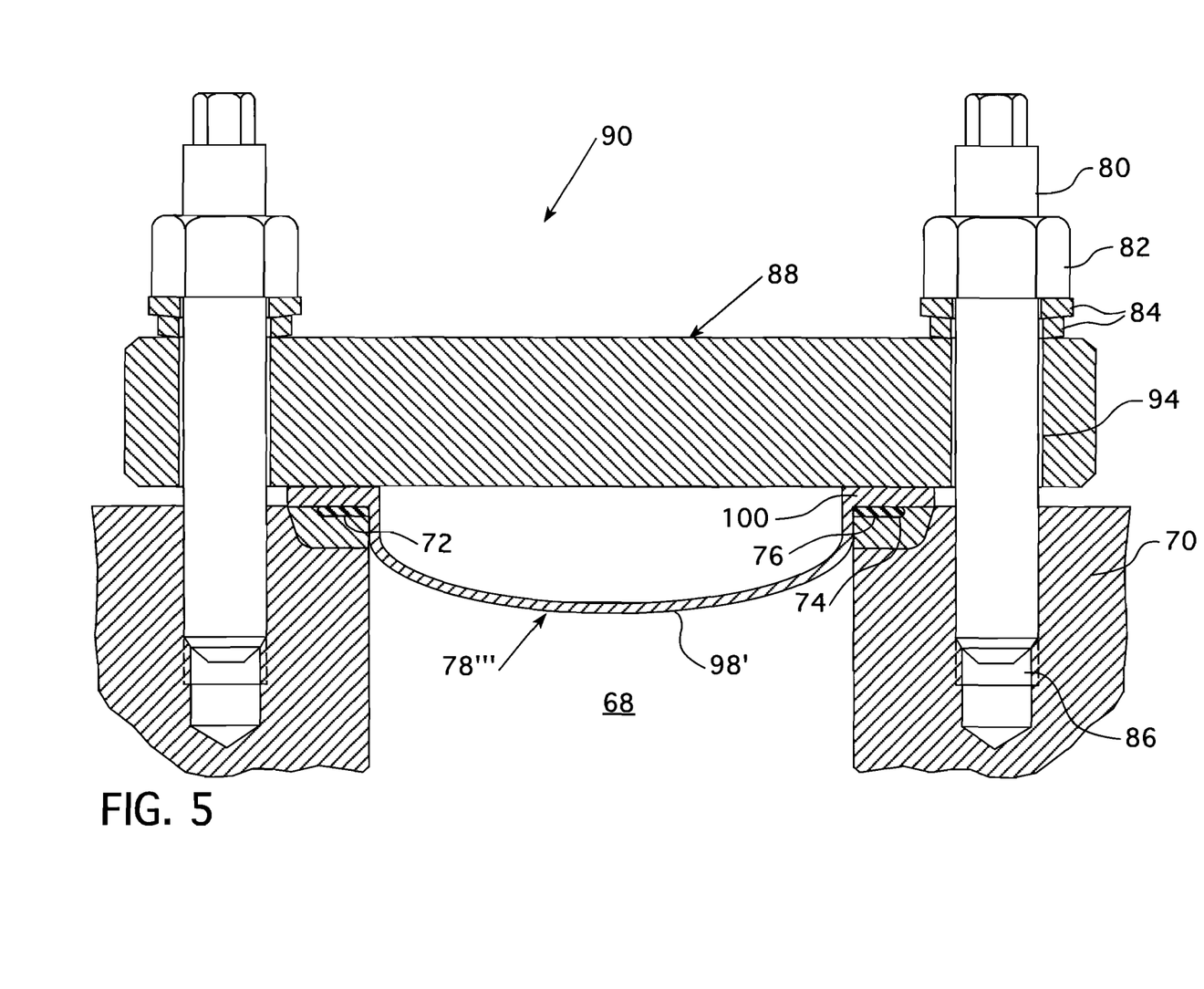
FIG. 5 is a side sectional view of a closure of this invention that employs a ellipsoidal insert and gasket seal.

FIG. 5 shows a second embodiment of this invention for use with a gasket seal 74. The embodiment shown in FIG. 5 is substantially identical to that shown in FIG. 4 in that the insert 78''' has a peripheral flange that rests over at least a portion of the sealing surface 72 and a continuously rounded portion 98' in between an inner edge of the flange 100 except that the rounded portion 98' instead of being a hemispherical shape as shown in FIG. 4 by reference character 98 is ellipsoidal as shown by reference character 98'.

Figure 6:
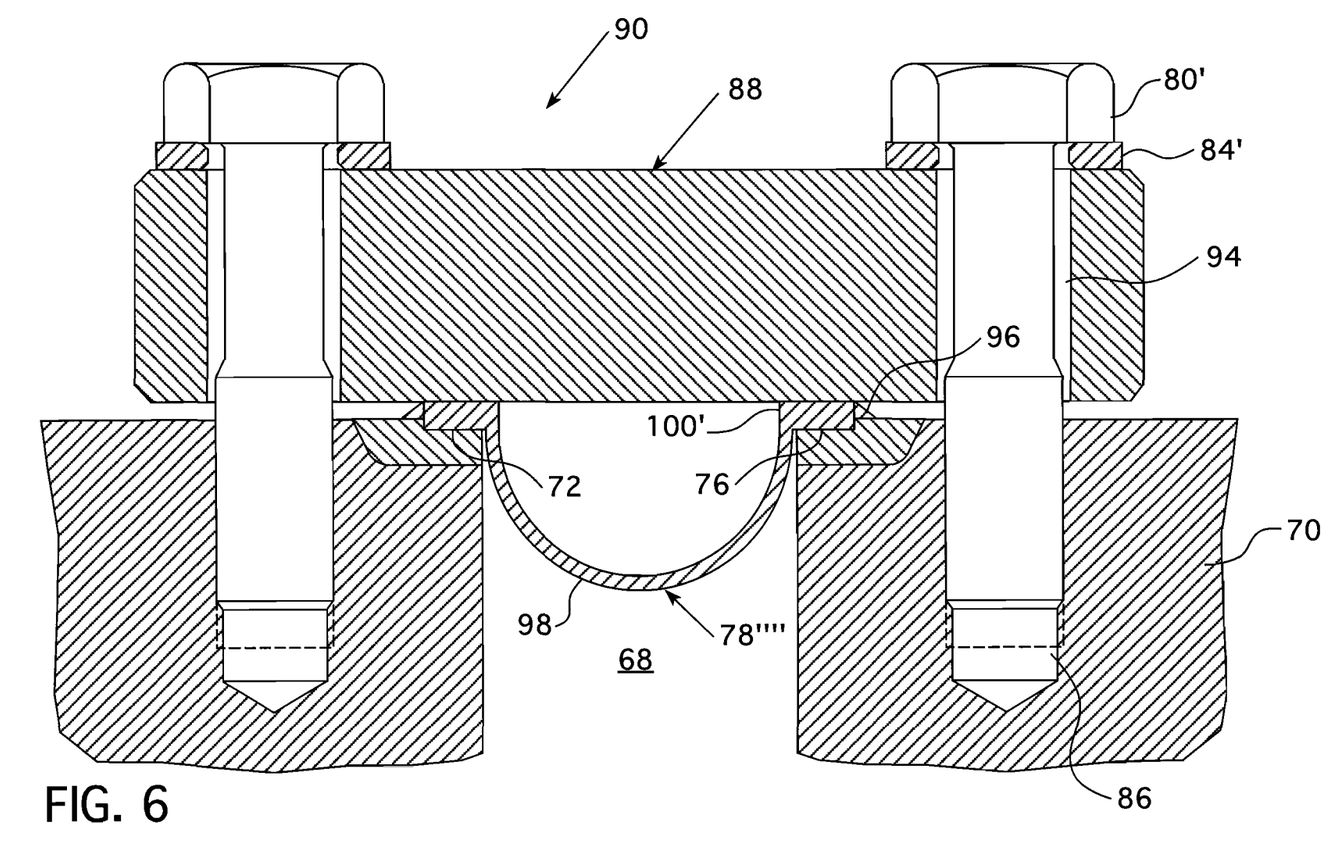
FIG. 6 is a side sectional view of a closure of this invention that employs a hemispherical diaphragm and fillet weld seal.

The embodiment shown in FIG. 6 is substantially identical to the seal welded closure illustrated in FIG. 3 except for the insert 78''''. The insert 78'''' is substantially identical to the insert 78" except that the flange is shorter to fit within the recess 76 in the sealing surface 72 in place of the gasket 74. The peripheral edge of the flange 100' is affixed to the sealing surface 72 with the fillet weld 96.

Figure 7:
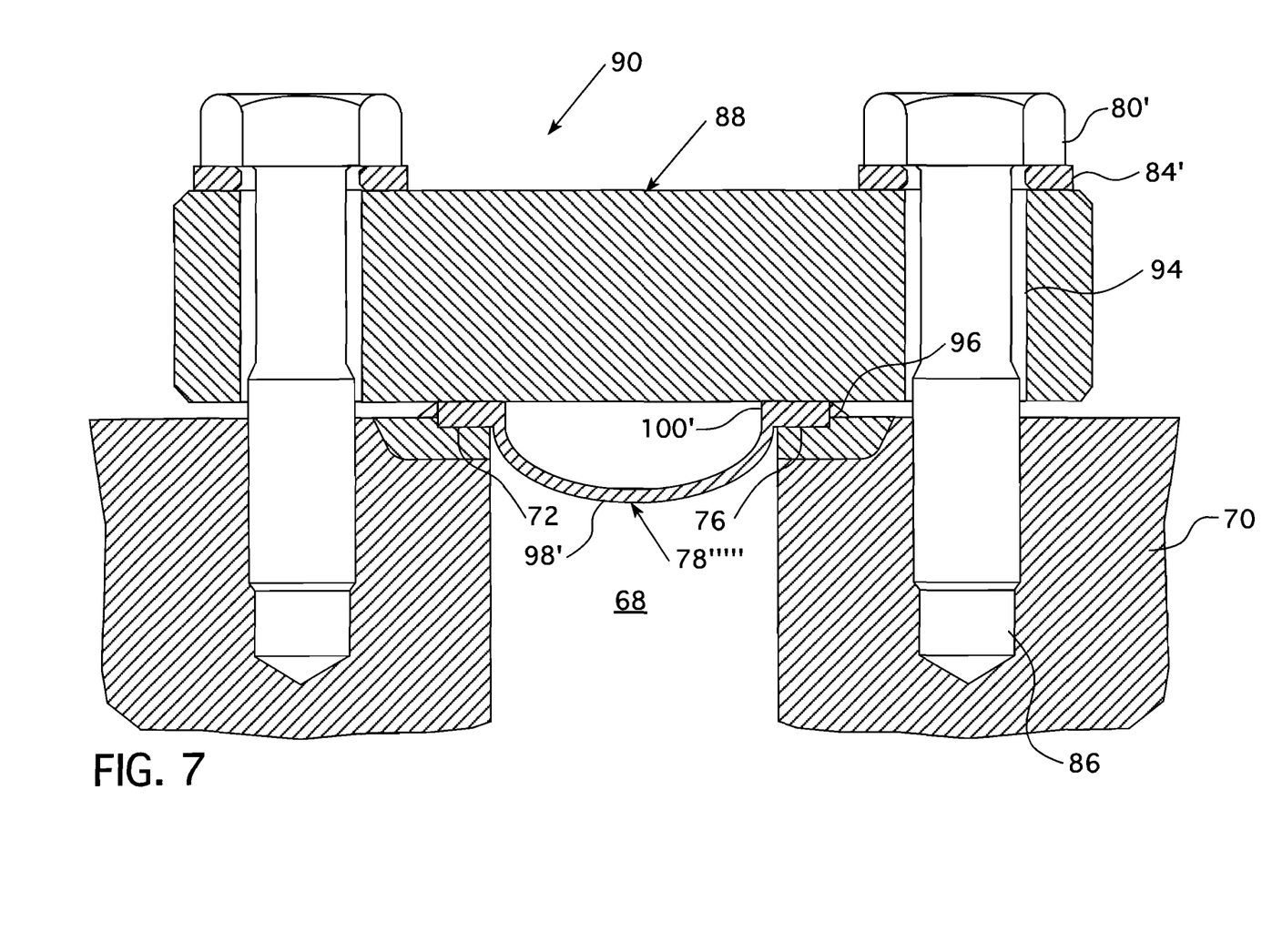
FIG. 7 is a side sectional view of a closure of this invention that employs a ellipsoidal diaphragm and fillet weld seal.

The embodiment shown in FIG. 7 is identical to the design illustrated in FIG. 6 except that the rounded portion 98' of the insert 78'''' is ellipsoidal in place of the rounded portion 98 illustrated in FIG. 6. In all respects the design of this invention, as illustrated in FIGS. 4-7 includes a smooth rounded portion that extends between the inner edge of a peripheral flange that is sealed to the sealing surface on the pressure vessel's exterior wall.

The domed form at the central region of the insert results in the internal pressure loading on the insert being transferred to a region of the closure cover that is radially outward from the center of the cover, thereby reducing the localized deflection of the cover, i.e., the load reacted into the cover is closer to the location of the cover attachment fasteners, thereby reducing the moment load on the fasteners, which consequently reduces the portion of the cover bending that is reacted through the cover attachment fasteners. When implemented as a seal welded closure, this configuration reduces the load imparted upon the diaphragm attachment weld, which is beneficial to meeting the requirements for fatigue life of the weld. When implemented as a gasket seal, the domed form facilitates the installation of the gasket by keeping it centered in the opening during cover installation and fastener tightening. In addition, the invention provides the aforementioned benefit to the cover fasteners resulting from the internal pressure load being moved/transferred radially outward from the center of the diaphragm plate body thereby reducing the bending load on the cover fasteners. Though threaded fasteners have been shown for attaching the cover 88 to the pressure vessel wall 70, it should be appreciated that a number of other fastener types that satisfy the load requirements can be used, such as a cable which fits within a hook on the top of the cover and is tensioned by a lever attached to the outer wall of the pressure vessel.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breath of the appended claims and any and all equivalents thereof.

What is claimed is:

1. A substantially rigid steam generator pressure vessel having a wall with an access opening of 2 in. (5.1 cm) or larger and a closure for the access opening comprising:
   a sealing surface on said wall surrounding the access opening;
   one of either a male or female locking device formed on or in said wall radially outward from said sealing surface at a plurality of locations around said access opening;
   an insert positioned to span said access opening, said insert having a peripheral flange that rests over at least a portion of said sealing surface and a continuously rounded concave portion completely extending between opposing sides of an inner edge of the flange and completely closing off the access opening with the rounded concave portion extending into the access opening;
   a sealing member between the sealing surface and the flange of the insert;
   a cover extending over the access opening and the insert and extending radially outward to at least said one of either the male or female locking device; and
   the other of the male or female locking device connecting the cover to the wall by engaging the one of the male or female locking device and pressuring the cover against the flange of the insert.

2. The pressure vessel of claim 1 wherein the sealing member is a gasket.

3. The pressure vessel of claim 1 wherein the sealing member is a weld.

4. The pressure vessel of claim 3 wherein the weld is a fillet weld.

5. The pressure vessel of claim 1 wherein the locking device is a threaded fastener.

6. The pressure vessel of claim 5 wherein the locking device extends through an opening in the cover.

7. The pressure vessel of claim 6 wherein the one of either a male or female locking device is a threaded recess in the wall and the other of the male or female locking device is a threaded fastener.

8. The pressure vessel of claim 7 wherein the threaded fastener is a bolt.

9. The pressure vessel of claim 1 wherein the rounded portion of the insert extends into the access opening.

10. The pressure vessel of claim 1 wherein the rounded portion of the insert is hemispherical.

11. The pressure vessel of claim 1 wherein the rounded portion of the insert is ellipsoidal.

12. The pressure vessel of claim 1 wherein the flange of the insert is thicker than the rounded portion.

* * * * *